United States Patent
Dolph et al.

(10) Patent No.: US 9,002,180 B2
(45) Date of Patent: Apr. 7, 2015

(54) MEDIA RECORDER

(75) Inventors: Blake Dolph, Elgin, IL (US); James Gordon Beattie, Jr., Bergenfield, NJ (US); Julia A. Hein, Huntley, IL (US); Rita H. Scherer, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 13/486,390

(22) Filed: Jun. 1, 2012

(65) Prior Publication Data

US 2013/0322841 A1 Dec. 5, 2013

(51) Int. Cl.
| | | |
|---|---|---|
| H04N 5/76 | (2006.01) | |
| H04N 9/80 | (2006.01) | |
| H04N 7/16 | (2011.01) | |
| H04N 5/445 | (2011.01) | |
| H04N 21/4147 | (2011.01) | |
| H04N 21/422 | (2011.01) | |
| H04N 21/4227 | (2011.01) | |
| H04N 21/432 | (2011.01) | |
| H04N 21/433 | (2011.01) | |
| H04N 21/4335 | (2011.01) | |
| H04N 21/442 | (2011.01) | |
| H04N 21/45 | (2011.01) | |
| H04N 21/472 | (2011.01) | |
| H04N 21/488 | (2011.01) | |
| H04N 21/845 | (2011.01) | |
| H04N 21/475 | (2011.01) | |

(52) U.S. Cl.
CPC ....... *H04N 21/4334* (2013.01); *H04N 5/44513* (2013.01); *H04N 5/76* (2013.01); *H04N 21/4147* (2013.01); *H04N 21/42204* (2013.01); *H04N 21/4221* (2013.01); *H04N 21/4227* (2013.01); *H04N 21/4325* (2013.01); *H04N 21/4335* (2013.01); *H04N 21/4424* (2013.01); *H04N 21/4532* (2013.01); *H04N 21/47214* (2013.01); *H04N 21/47217* (2013.01); *H04N 21/4753* (2013.01); *H04N 21/4755* (2013.01); *H04N 21/488* (2013.01); *H04N 21/8455* (2013.01); *H04N 2005/44534* (2013.01)

(58) Field of Classification Search
USPC .................. 386/291–299, 239–248; 725/151
See application file for complete search history.

(56) References Cited

U.S. PATENT DOCUMENTS

| | | | |
|---|---|---|---|
| 5,946,445 A | 8/1999 | Peters | |
| 6,678,461 B1 | 1/2004 | Peters | |
| 8,083,593 B2 | 12/2011 | White | |
| 8,737,820 B2 * | 5/2014 | Hilem | ............ 386/343 |
| 2002/0199185 A1 * | 12/2002 | Kaminski et al. | ............ 725/25 |

(Continued)

FOREIGN PATENT DOCUMENTS

WO  WO 92/22983  * 12/1992  ............ H04N 5/781

*Primary Examiner* — Hung Dang
(74) *Attorney, Agent, or Firm* — Toler Law Group, PC

(57) ABSTRACT

A particular method includes displaying a user interface for a media recorder in response to first user input. The method includes receiving a command to display recording space for the media recorder via the user interface. The method also includes sending a representation of the recording space to a display device. The representation includes a first indicator of available recording space, a second indicator of recording space used to store first media content that is deletable without additional user input when one or more conditions are met, and a third indicator of recording space used to store second media content, where an item of the second media content can only be deleted by the media recorder when the media recorder receives a user command to delete the item.

20 Claims, 7 Drawing Sheets

(56) References Cited

U.S. PATENT DOCUMENTS

| | | | |
|---|---|---|---|
| 2006/0140584 A1* | 6/2006 | Ellis et al. | 386/83 |
| 2007/0067217 A1* | 3/2007 | Schachter et al. | 705/14 |
| 2008/0094312 A1* | 4/2008 | Feigenbaum | 345/2.2 |
| 2008/0163307 A1* | 7/2008 | Coburn et al. | 725/61 |
| 2008/0295131 A1* | 11/2008 | Grover et al. | 725/39 |
| 2009/0142036 A1* | 6/2009 | Branam et al. | 386/83 |
| 2009/0210779 A1* | 8/2009 | Badoiu et al. | 715/230 |
| 2009/0249185 A1* | 10/2009 | Datar et al. | 715/230 |
| 2010/0046919 A1* | 2/2010 | Song | 386/95 |
| 2011/0052156 A1* | 3/2011 | Kuhn | 386/295 |
| 2012/0008920 A1* | 1/2012 | Miyata et al. | 386/248 |
| 2013/0055146 A1* | 2/2013 | Armitage | 715/781 |

* cited by examiner

MEDIA RECORDER

FIELD OF THE DISCLOSURE

The present disclosure is generally related to media recorders.

BACKGROUND

A media recorder may be used to record media content and later playback the media content on a flexible schedule. Scheduled programming may be recorded via the media recorder and viewed when convenient. The media recorder may include functionality for recording media content, managing recorded media content, and playing recorded media content to a display device. The media recorder may include functionality that displays a representation of the recording space of the media recorder. The representation may be a bar chart that shows a first bar that represents available recording space and a second bar that represents media content recorded by the media recorder.

DETAILED DESCRIPTION

Figure 1:
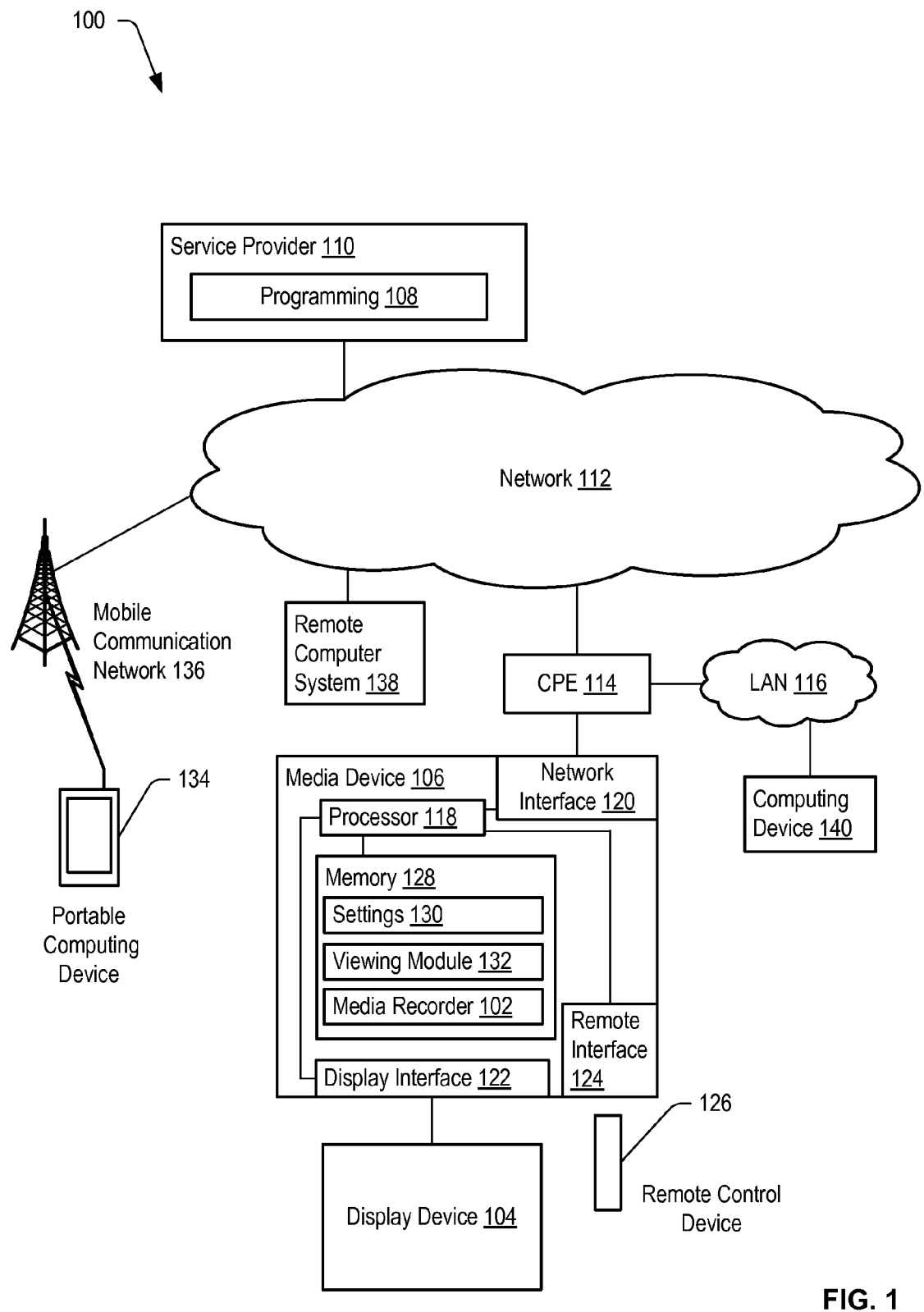
FIG. 1 is a block diagram of an embodiment of a system that includes a media recorder.

A media recorder may be used to record media content. The media recorder may include functionality to facilitate management of recorded media content. A user may view a representation of recording space for the media recorder via a media recorder interface. The representation may include a first indicator of recording space available for media content, a second indicator of recording space used to store first media content that the media recorder can delete without additional user input when one or more conditions are met, and a third indicator of recording space used to store second media content, where an item of the second media content can only be deleted by the media recorder when the media recorder receives a user command to delete the item. A large third indicator may indicate to the user that certain media content designated to be kept until deleted should be deleted to make more space available for recording additional media content.

A media recorder interface may enable the user to access functionality provided by the media recorder. For example, the media recorder interface may enable the user to view the representation of the recording space. The media recorder interface may enable selected media content to be categorized or grouped together. Media content that has been grouped together may be represented by a folder. The media recorder interface may enable the user to edit or rename folders and titles of media content saved by the media recorder. The media recorder interface may enable users to associate comments with particular media content. The media recorder interface may enable viewers of media content to resume viewing particular media content from a location of one or more bookmarks associated with locations in the particular media content where the particular media content was stopped during playback.

The media recorder interface may enable the user to display a listing of information associated with media content stored by the media recorder. The listing may include folders, titles, recording dates, size indicators, comment indicators, bookmark indicators, status indicators, other information, or combinations thereof. The user may sort the listing by folders or titles (e.g., alphabetically), by recording dates, by size indicators, by comment indicators, by bookmark indicators, by status indicators, or by the other information.

The media recorder may enable the user to snip a portion of particular media content to reduce a size of the particular media content. Snipping a portion of the particular media content may save space on the media recorder by removing a portion of the particular media content that will not be viewed. The portion that is removed may be a portion from a current playback position in the particular media content to the beginning of the particular media content, a portion from the current playback position to an end of the particular media content, or a portion from the current playback position to a particular bookmark.

In a particular embodiment, a method includes displaying a user interface for a media recorder in response to first user input. The method includes receiving a command to display recording space for the media recorder via the user interface. The method also includes sending a representation of the recording space to a display device. The representation includes a first indicator of available recording space, a second indicator of recording space used to store first media content that is deletable without additional user input when one or more conditions are met, and a third indicator of recording space used to store second media content, where an item of the second media content can only be deleted by the media recorder when the media recorder receives a user command to delete the item.

In a particular embodiment, a media recorder includes a processor and a memory accessible to the processor. The memory includes instructions executable by the processor to display a user interface for the media recorder in response to first user input. The memory includes instructions executable by the processor to receive a command to display recording space for the media recorder via the user interface. The memory also includes instructions executable by the processor to send a representation of the recording space to a display device. The representation includes a first indicator of available recording space, a second indicator of recording space used to store first media content that is deletable without additional user input when one or more conditions are met, and a third indicator of recording space used to store second media content, where an item of the second media content can only be deleted by the media recorder when the media recorder receives a user command to delete the item.

In a particular embodiment, a non-transitory computer-readable medium includes instructions executable by a processor to display a user interface for a media recorder in response to first user input. The non-transitory computer-readable medium includes instructions executable by the processor to receive a command to display recording space for the media recorder via the user interface. The non-transitory computer-readable medium also includes instructions executable by the processor to send a representation of the recording space to a display device. The representation includes a first indicator of recording space available for media content, a second indicator of recording space used to store first media content that the media recorder can delete without additional user input when one or more conditions are met, and a third indicator of recording space used to store second media content, where an item of the second media content can only be deleted by the media recorder when the media recorder receives a user command to delete the item.

FIG. 1 is a block diagram of a particular embodiment of a system 100 including a media recorder 102. The media recorder 102 may be a digital video recorder (DVR). The system 100 may include a display device 104 that presents media content to one or more viewers. The display device 104 may receive the media content from a media device 106. The media device 106 may be a set-top box device or another device able to send the media content to the display device 104. The media device 106 may be an integral component of the display device 104 or a separate component. The media content may be programming 108 (e.g., television programming or pay per view programming) transmitted by a service provider 110 or another entity to the media device 106 via a network 112 and via customer premises equipment (CPE) 114. The CPE 114 may facilitate communications to and from the network 112 and a local area network (LAN) 116 coupled to the CPE 114. The CPE 114 may include a router, a wireless router, a local area network device, a modem (e.g., a digital subscriber line (DSL) modem or a cable modem), a residential gateway, another communication device, or combinations thereof. The media content may also include recorded media content sent to the display device 104 from the media recorder 102. The media recorder 102 may be an integral component of the media device 106 or a separate component coupled to the media device 106. The CPE 114 may also be an integral component of the media device 106 or a separate component coupled to the media device 106.

The media device 106 may include a processor 118. The processor 118 may be coupled to a network interface 120, a display interface 122, a remote interface 124, and a memory 128. The network interface 120 may enable the media device 106 to communicate via the network 112, via the LAN 116, or both. The display interface 122 may enable the media device 106 to send information to the display device 104. The remote interface 124 may enable the media device 106 to receive user commands from a remote control device 126, another input device, or both.

The memory 128 may store data, such as settings 130 for the media device 106, media content, and other information. The data may also include instructions executable by the processor 118 to perform tasks. For purposes of description, the instructions stored in the memory 128 of the media device 106 are illustrated in FIG. 1 as functional modules. For example, the memory 128 may include a viewing module 132 that is operable to tune to a particular channel, to receive media content associated with the channel, to process the media content, and to send the processed media content to the display device 104.

The memory 128 may also include the media recorder 102 as a functional module of instructions executable by the processor 118. The media recorder 102 may be operable to record media content, to schedule recording of particular media content at a particular time for a particular time range, to facilitate playback of recorded media content to the display device 104 or another device, to perform tasks associated with management and control of recorded media content, or combinations thereof. The media content may include the programming 108 received from the service provider 110.

In other embodiments, the media recorder 102 is an external media recorder that is communicatively coupled to the media device 106. The external media recorder may include a processor and a memory accessible to the processor. The memory of the external media recorder may store media content and may include instructions executable by the processor of the external media recorder to perform media recorder and media player functionality.

The media recorder 102 may generate a media recorder interface displayable on the display device 104 that enables a user to interact with the media recorder 102. One or more external devices may include media recorder interfaces that enable the external devices to access and control the media recorder 102. For example, a portable computing device 134 (e.g., a mobile communication device, tablet computer, personal digital assistant, lap top computer, other type of communication device, or combinations thereof) that includes a media recorder interface may access the media recorder 102 via a network connection provided by a mobile communication network 136 and the network 112 to schedule media recordings and to perform media content management. As another example, a remote computer system 138 (e.g., a computer at a work site of the user) may be used to access the media recorder 102 via the network 112 to schedule media recording and to perform media content management. As another example, a computing device 140 (e.g., a mobile communication device, tablet computer, personal digital assistant, desk top computer, lap top computer, other type of communication device, or combinations thereof) that includes a media recorder interface may access the media recorder 102 via the LAN 116 to schedule media recording and to perform media content management. In some embodiments, the external devices may be able to receive media content from the media recorder 102 for playback.

Figure 2:
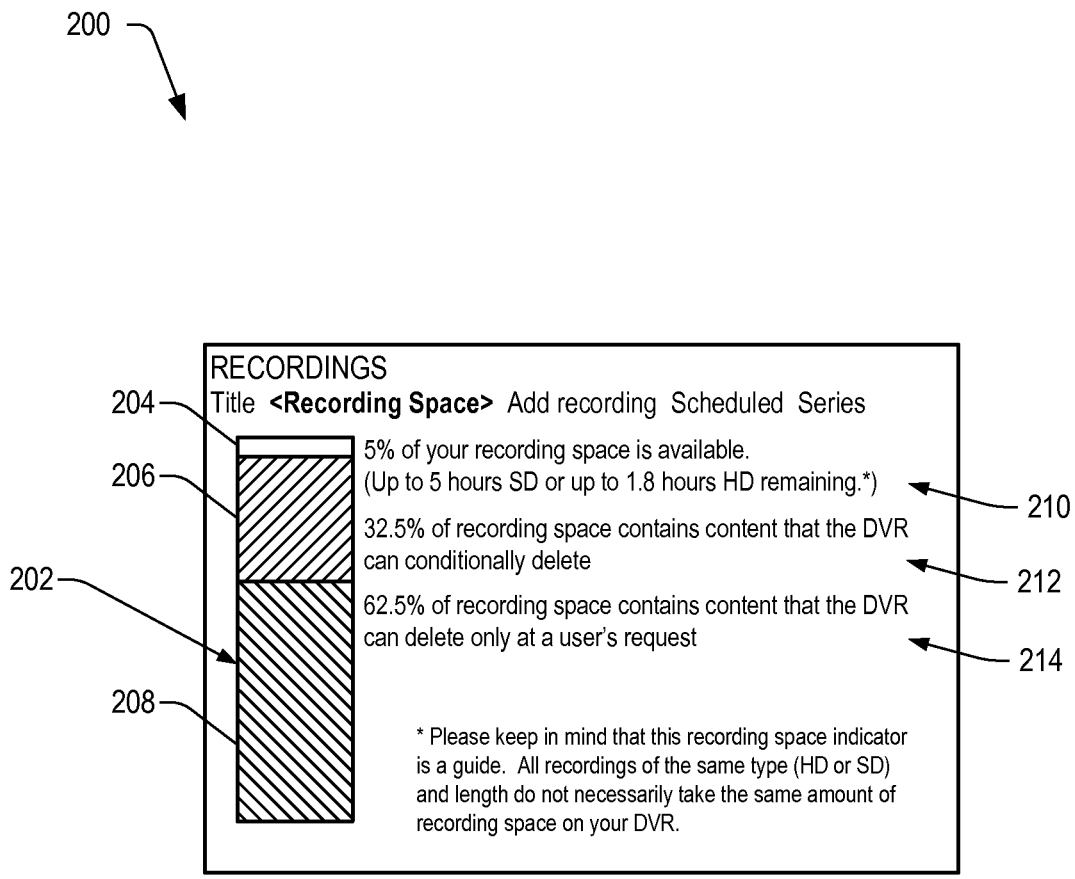
FIG. 2 is a representation of a particular embodiment of a portion of a media recorder interface displaying a representation of recording space for a media recorder.

The media recorder interface of a device (e.g., the media device 106, the portable computing device 134, the remote computer system 138, or the computing device 140) may be used to initiate recording of media content, manage stored media content, activate other features associated with the media recorder 102, or combinations thereof. The media recorder interface may be used to graphically display recording space of the media recorder 102. The graphic display may be shown in the form of a bar chart (e.g., as depicted in FIG. 2), as a pie chart, or in another graphical form. The media recorder interface may be implemented as a software program (e.g. user interface software) that is executable by a processor in a computing device.

The graphic display may include a first indicator of recording space available for media content. Associated with the first indicator may be indicia that indicates a percentage or other measure of available recording space, indicia that indicates a first estimate of a number of hours of recording time corresponding to the first indicator for recording in a high definition (HD) format, and indicia of a second estimate of a number of hours of recording time corresponding to the first indicator for recording in a standard definition (SD) format.

The graphic display may include a second indicator of recording space used to store first media content that the media recorder 102 can delete without additional user input when one or more conditions are met. The one or more conditions may be established when the media content is scheduled to be recorded. In a particular embodiment, the media recorder 102 may be setup to keep a number of episodes of a series (e.g., one, two, three, or more). For example, the media recorder 102 may be scheduled to keep three episodes of a particular series. The media recorder 102 may delete an earliest episode of three previously recorded episodes of the series when the media recorder 102 records a fourth episode of the series. The earliest episode may be deleted prior to a start of recording of the fourth episode of the series, during recording of the fourth episode of the series, or after recording the fourth episode of the series. The media recorder 102 may be setup to delete selected media content after the selected media is completely viewed or substantially completely viewed (e.g., viewed up until credits for the media content are displayed). The media recorder 102 may be setup to keep recorded media content until additional space is needed. For example, some programs may be designated to be kept until space is needed. The media recorder 102 may determine that additional space is needed to enable a particular program to be recorded as requested. The media recorder 102 may delete one or more of the programs designated to be kept until space is needed to create additional space prior to starting to record the particular program. Which program or programs are deleted may be based on when the programs were recorded, sizes of the programs, other characteristics of the programs, or combinations thereof.

The user may be able to select the second indicator using the remote control device 126 or another input device. Selection of the second indicator may cause the media recorder interface to display a listing of the first media content. The user may view, delete, change a deletion condition, or combinations thereof, of any of the media content presented in the listing. For example, the user may select to delete a particular episode of a series in the listing that the user already viewed. The user may delete the particular episode from the media recorder 102.

The graphic display may include a second indicator of recording space used to store second media content. An item of the second media content may be deleted by the media recorder 102 only when the media recorder 102 receives a user command to delete the item. For example, the item may be designated to be kept until deleted when the item is scheduled to be recorded by the media recorder 102. When the program is recorded by the media recorder 102, the program is kept (e.g. stored in a local memory device or a remote memory device) until a user command to delete the program is received.

The user may be able to select the third indicator using the remote control device 126 or other input device. Selection of the third indicator may cause the media recorder interface to display a listing of the second media content. The user may view, delete, change a deletion condition, or combinations thereof, of any of the media content presented in the listing. For example, the user may change a designation of a particular item in the listing from keep until erased to keep until space is needed.

The media recorder interface of the media device (e.g., the media device 106, the portable computing device 134, the remote computer system 138, or the computing device 140) may be used to display information associated with media content stored by the media recorder 102. The information may be presented as a listing. The listing may include names of one or more folders. A folder may be used by a user to categorize and organize recorded media content. The user may create a folder, enter a name for the folder, and assign media content to the folder. The user may establish a password that needs to be entered to view content of the folder. For example, the user may create a folder and title the folder "Sports." The user may select one or more media content titles, drag the one or more media content titles to the folder, and drop the one or more media content titles into the folder. The folder may include one or more sporting events that the user believes are too violent to be viewed by children without supervision, so the user may establish a password that needs to be entered to gain access to the media content in the Sports folder.

In addition to displaying names of the one or more folders, the listing may include titles of media content stored by the media recorder 102. The media recorder interface may enable the user to rename or amend the titles. For example, particular media content may be identified as "Curious George." The user may amend the title to be "Curious George—backpack episode" to be more descriptive of the content of the program.

Associated with each title may be information related to the media content identified by the title. The information may include, but is not limited to, date recorded, a size indicator, a comment indicator, a bookmark indicator, a status indicator, additional information, or combinations thereof. The user may be able to sort the listing by title, by date, by size, by comment indicator, by bookmark indicator, by status indicator, or by other information.

The size indicator may indicate the storage space used to store particular media content. The size indicator may be a numerical value (e.g., size in gigabytes) or a size range indicator (e.g., XL, L, M, and S to indicate extra large, large, medium, and small, respectively). Presence of the size indicator may facilitate removal of selected media content to free up space for planned recordings.

The comment indicator may indicate whether a viewer of particular media content entered a comment associated with the media content. For example, the comment indicator may be a "C" to indicate that a comment was entered. A numerical value may also be associated with the comment indicator to indicate a number of comments associated with the media content. For example, the comment indicator for particular media content may be "C3" to indicate that three comments are associated with the particular media content. Selection of the comment indicator associated with media content may result in the media recorder interface displaying a comment or comments associated with the media content. For example, a first viewer of particular media content may select an option to leave a comment when viewing the particular media content. The comment may be "I watched this, and you can delete if desired." The comment may be typed in or may be a voice message. The comment may be associated with the particular media content and stored in the settings 130 of the memory 128. A second viewer may view the listing of media content and notice that a comment indicator is associated with the particular media content. The second viewer may select the comment indicator. The comment may be retrieved from the memory 128 and the comment may be presented to the second viewer.

A bookmark indicator may indicate whether a viewer of particular media content stopped watching the particular media content before an end of the particular media content. The bookmark indicator may be a "B" to indicate a bookmark. A numerical value may also be associated with the bookmark indicator to indicate a number of bookmarks associated with the media content. For example, the bookmark indicator for particular media content may be "B2" to indicate that two bookmarks are associated with the particular media content. When a viewer who is watching the particular media content stops the particular media content before the end of the media content, a location in the particular media content when playback was stopped (i.e., an elapsed time from the beginning of the particular media content) may be associated with the particular media content and stored in the settings 130 of the memory 128. The bookmark indicator may be changed to reflect the presence of the bookmark. When the particular media content is played again, the user may be presented with an option to play the particular media content from the beginning and an option to play the particular media content starting at the location of the bookmark. When the option to play the particular media content starting at the location is selected, the location may be received from the settings 130, and playback of the particular media content may be started at the location.

A status indicator may indicate what condition needs to be met before particular media content can be deleted. The status indicator may include an abbreviation corresponding to a deletion condition. For example, the status indicator may be "D" for keep until deleted, "N" for keep until space needed, "V" for keep until viewed, "e2" for keep two most recent episodes, "e3" for keep three recent episodes, etc. Other abbreviations or symbols may be also be used. When a particular status indicator is highlighted, the media recorder interface may display a more detailed explanation of the status indicator. A default status indicator may be selected or applied for media content that is recorded by the media recorder 102. When the user selects particular media content to be recorded, a different status indicator may be selected. Also, the media recorder interface may allow the status indicator to be changed. For example, the user may select the status indicator "V" in the listing for particular media content. The media recorder interface may indicate that the status indicated by "V" means to keep the particular media content until the particular media content is viewed. The media recorder interface may present a selectable "change status" option. When the user selects the change status option, the media recorder interface may present available options that the status can be changed to. When the user selects a particular option (e.g., the option "D" to keep until deleted), the status and the status indicator for the particular media content may be changed to the particular option.

During playback of particular media content by the media recorder 102, the media recorder 102 may receive a snip command from the user (e.g., via the remote control device 126). The media recorder 102 may stop playback of the particular media content when the snip command is received at a first location. The user may be presented with snip options by the media recorder interface to receive a second location or a cancellation of the snip command. The snip options may include an option to snip to the beginning, an option to snip to the end, and a cancel option. When the cancel option is received, the media recorder 102 may wait to receive another command from the user. When the option to snip to beginning is received, the second location is the end of the particular media content. When the option to snip to the end is received, the second location is the beginning of the particular media content. When the second location is determined, a portion of the particular media content may be saved as the particular media content by the media recorder 102. The portion includes media content from the first location to the second location.

FIG. 2 is a representation of a particular embodiment of a portion of a media recorder interface 200 for a media recorder (e.g., the media recorder 102 shown in FIG. 1). The media recorder interface 200 may graphically depict recording space 202 for the media recorder. The media recorder interface 200 may include a first indicator 204 that depicts recording space available for recording media content. The media recorder interface 200 may include a second indicator 206 that depicts recording space used to record items of first media content that can be deleted by the media recorder when one or more conditions are met. The second indicator 206 may be selectable. When the second indicator 206 is selected, the media recorder interface 200 may display a listing of information associated with the first media content (e.g., titles, recording dates, sizes, comment indicators, bookmark indicators, etc.). The recording space 202 may also include a third indicator 208 that depicts recording space used to record items of second media content. A particular item of second media content may be kept by the media recorder until the media recorder receives a user command to delete the particular item. The third indicator 208 may be selectable. When the third indicator 208 is selected, the media recorder interface 200 may display a listing of information associated with the second media content (e.g., titles, recording dates, sizes, comment indicators, bookmark indicators, etc.).

The media recorder interface 200 may display a first indicia 210 of a size of the first indicator 204. The first indicia 210 may describe a size of the first indicator 204 as an approximate percentage of total available recording space. The first indicia 210 may describe the size of the first indicator 204 as an estimate of recording time remaining if the media recorder records standard definition media content. The first indicia 210 may also, or in the alternative, describe the size of the first indicator 204 as an estimate of recording time remaining if the media recorder records high definition media content, or other media content (e.g., 3D (three dimensional) media content).

The media recorder interface 200 may display a second indicia 212 of a size of the second indicator 206. The second indicia 212 may describe a size of the second indicator 206 as an approximate percentage of total available recording space. The media recorder interface 200 may also display a third indicia 214 of a size of the third indicator 208. The third indicia 214 may describe a size of the third indicator 208 as an approximate percentage of total available recording space. When the third indicia 214 indicates that the size of the third indicator 208 is a large percentage of the total available recording space, the viewer may infer that the media content corresponding to the third indicator 208 should be reviewed to determine one or more items that can be deleted in order to free up additional recording space.

Figure 3:
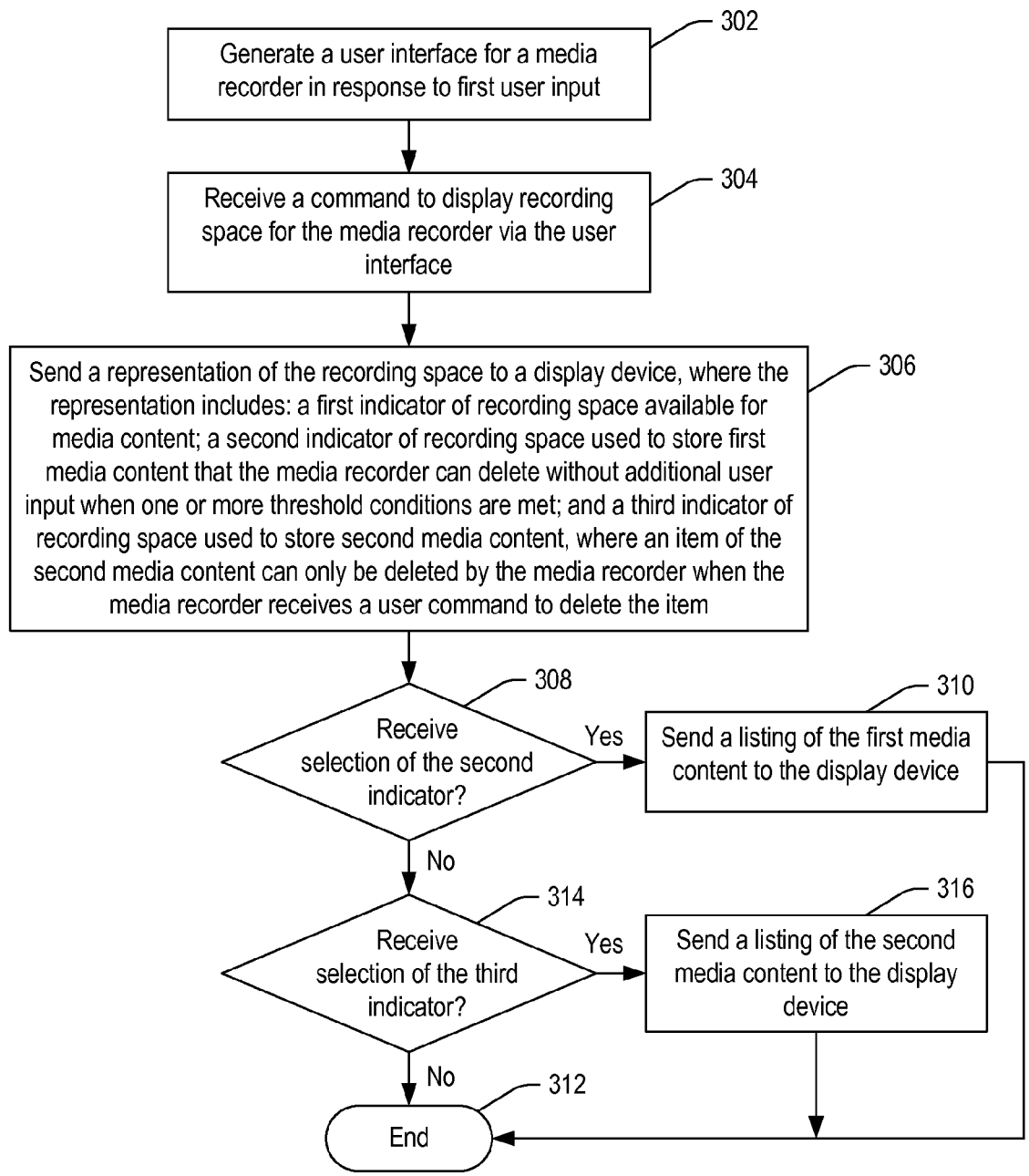
FIG. 3 is a flow chart of a first particular embodiment of a method of using a media recorder.

FIG. 3 is a flow chart of a first particular embodiment of a method of using a media recorder. In a particular embodiment, the method may be performed by a device that is coupled to the media recorder (e.g., the media device 106, the portable computing device 134, the remote computer system 138, or the computing device 140 of FIG. 1). At 302, a user interface for the media recorder may be generated and displayed in response to first user input (e.g., a command to start an application or program that enables a user to see information about the media recorder, control the media recorder, or both).

A command may be received to display recording space for the media recorder via the user interface, at 304. At 306, a representation of the recording space may be sent to a display device (e.g., the representation 202 depicted in FIG. 2). The representation may include a first indicator of recording space available for media content. The representation may include a second indicator of recording space used to record first media content that the media recorder can delete without additional user input when one or more conditions are met. The representation may also include a third indicator of recording space used to store second media content. An item of the second media content can only be deleted by the media recorder when the media recorder receives a user command to delete the item.

At 308, a determination of whether the media recorder interface received selection of the second indicator may be made. When the second indicator is selected, a listing of the first media content may be sent to the display device, at 310.

The listing may include, but is not limited to, titles of media content included in the first media content, recording dates, size indicators for the media content included in the first media content, status indicators, comment indicators, bookmark indicators, other information, or combinations thereof. The user may delete particular media content in the listing, change characteristics of particular media content in the listing (e.g., change a status from keep until space is needed to a status of keep until deleted), view particular media content in the listing, or combinations thereof. The method may end, at 312.

The media recorder interface enables the user to display the representation of the recording space for the media recorder. The representation may include the available space, space used by media content that can be deleted by the media recorder when particular conditions are met, and space used by media content that can only be deleted by user command. When the space used by media content that can only be deleted by user command becomes large, the user may select the representation to display a listing of the media content that can only be deleted by user command. The user may select one or more media content titles from the listing and enter a delete command to free up space for additional media content. The representation may provide information to the user about categorizations of media content saved by the media recorder and may facilitate management of saved media content by making it easy to view a particular category of media content and delete selected items of media content included in the particular category.

When the second indicator was not selected, at 308, a determination of whether the media recorder interface received selection of the third indicator may be made, at 314. When the third indicator was selected, a listing of the second media content may be sent to the display device, at 316. The listing of the second media content may include, but is not limited to, titles of media content included in the second media content, recording dates, size indicators for the media content included in the second media content, status indicators, comment indicators, bookmark indicators, other information, or combinations thereof. The user may delete particular media content in the listing, change characteristics of particular media content in the listing (e.g., change a status from keep until deleted to a status of keep until space is needed), view particular media content in the listing, or combinations thereof. The method may end, at 312. When the third indicator was not selected, at 314, the method may end at 312.

Figure 4:
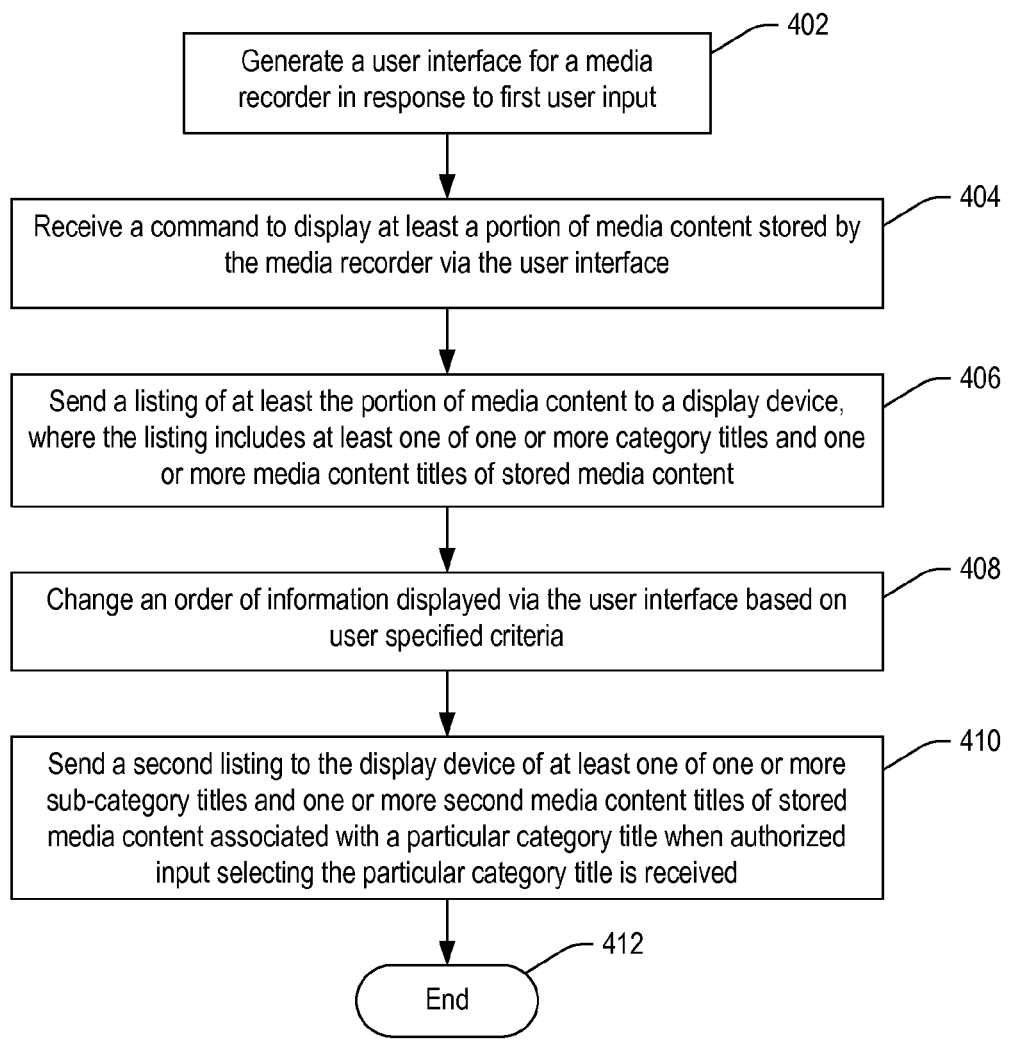
FIG. 4 is a flow chart of a second particular embodiment of a method of using a media recorder.

FIG. 4 is a flow chart of a second particular embodiment of a method of using a media recorder. In an embodiment, the method may be performed by a device that is coupled to the media recorder (e.g., the media device 106, the portable computing device 134, the remote computer system 138, or the computing device 140 of FIG. 1). At 402, a user interface for the media recorder may be generated in response to first user input (e.g., a command to start an application or program that enables a user to see information about the media recorder, control the media recorder, or both).

A command may be received to display at least a portion of media content stored by the media recorder, at 404. For example, the command may be a command to display all recorded content, a command to display all content that has been designated as "Save until deleted," a command to display all content that the media recorder may delete without additional user input when one or more conditions are met, or a command to display a particular genre of recorded content, etc. In response to the command, a listing of at least the portion of media content may be sent to a display device, at 406. The listing may include one or more category titles, one or more media content titles, or both, of stored media content. The listing may also include other information such as, but not limited to, recording dates, size indicators for the media content, status indicators, comment indicators, bookmark indicators, other information, or combinations thereof.

An order of the information displayed in the listing may be changed based on user specified criteria, at 408. Initially, the order of the listing may be an alphabetical listing of any category titles, followed by any media content titles sorted alphabetically. The user may change the order of the listing by selecting a particular header for a column of the listing. For example, the user may select a header for a comment indicator column to sort the listing so that media content with user added comments are displayed first in the listing.

A second listing one of one or more sub-category titles, one or more second media content titles, or both, of stored media content associated with a particular category title may be sent to the display device when authorized input selecting the particular category title is received, at 410. For example, when the particular category title is password protected (e.g., to inhibit children from unsupervised viewing of media content included in the particular category), authorized input may include entry of a password for the particular category in a password field displayed by the user interface. When the particular category title is not password protected, authorized input may be selection of the particular category. An order of the information displayed in the second listing may be changed based on user specified criteria. The method may end, at 412.

The media recorder interface enables the user to display at least a portion of media content stored by the media recorder. The portion may be all of the media content, a genre of media content, all content that has been designated as "Save until deleted," all content that the media recorder may delete without additional user input when one or more conditions are met or other subset of the media content stored by the media recorder. The display may include information about the media content. The information may include, but is not limited to, folder titles, media content titles, date recorded, size indicators, comment indicators, bookmark indicators, status indicators, additional information, or combinations thereof. The display may be organized by user selected information (e.g., by title, by size, by date recorded, etc.). The display may enable the user to easily manage recorded media content and to easily access and utilize features provided by the media recorder (e.g., viewing comments associated with particular media content).

Figure 5:
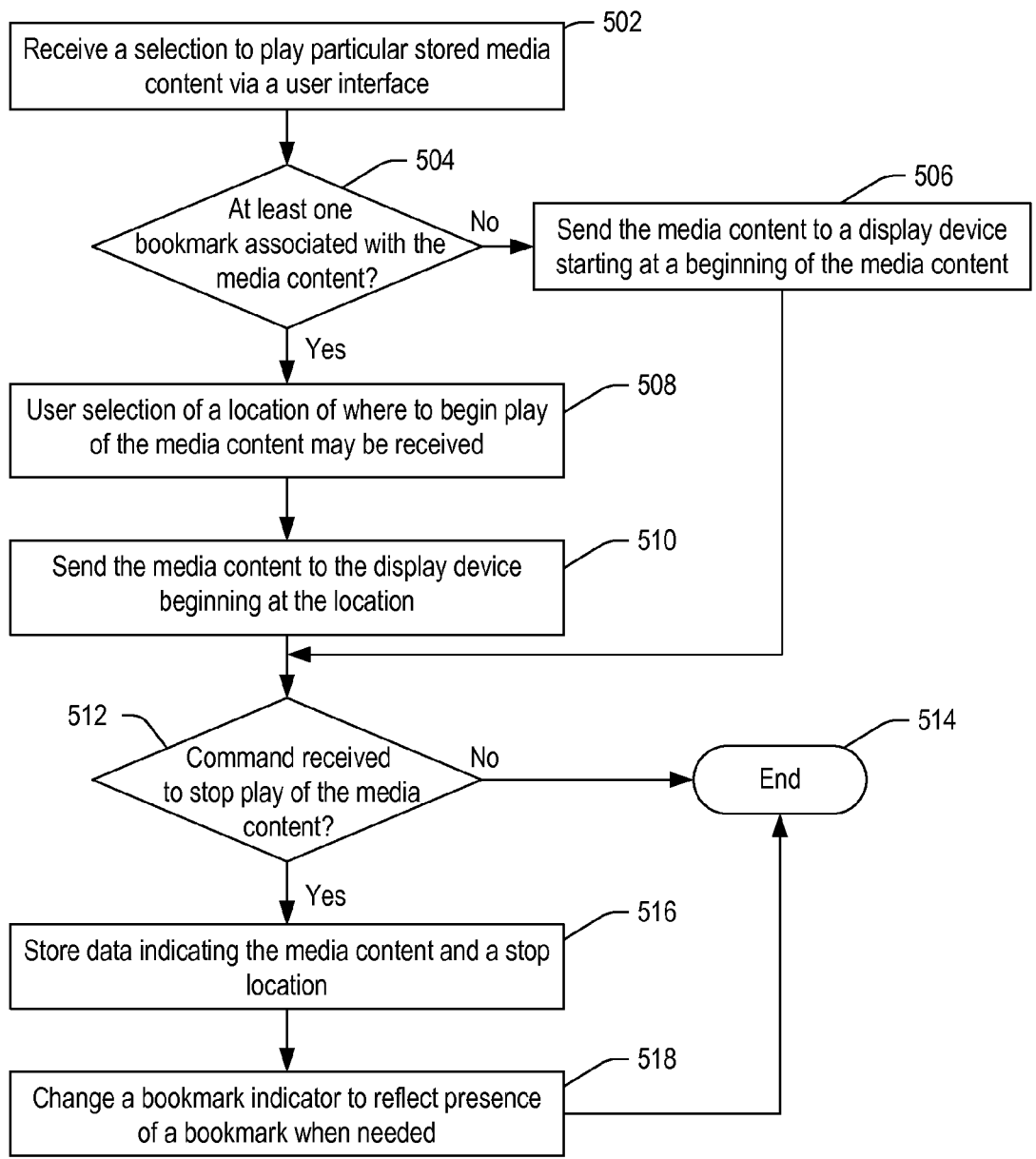
FIG. 5 is a flow chart of a third particular embodiment of a method of using a media recorder.

FIG. 5 is a flow chart of a third particular embodiment of a method of using a media recorder. In an embodiment, the method may be performed by a device that is coupled to the media recorder (e.g., the media device 106, the portable computing device 134, the remote computer system 138, or the computing device 140 of FIG. 1). At 502, a selection to play particular stored media is received from a user.

A determination may be made of whether at least one bookmark is associated with the media content, at 504. When no bookmark is associated with the media content, the media content may be sent to a display device starting at a beginning of the media content, at 506, and the method may continue, at 512

When at least one bookmark is associated with the media content as indicated by the presence of bookmark data associated with the media content, a user selection of a location of where to begin play of the media content may be received, at 508. The user may be presented with options to play the media content from the beginning or from a location associated with a particular bookmark. When there is only one bookmark associated with the media content, the option to play from the location associated with the particular bookmark may be presented as an option to resume playing the media content. When there is more than one bookmark associated with the media content, the user may be presented with options to start play from the locations associated with the bookmarks. The locations may be presented as elapsed play times, as bookmarks associated with particular users, or both. In some embodiments, a thumbnail image of a scene at each elapsed play time associated with a bookmark may be displayed to facilitate user selection of the appropriate bookmark. In some embodiments, play of the media content may begin a set period of time (e.g., 0.5 seconds, 1 second, 2 seconds, or another amount of time) before the location where the media content was stopped. The media content may be sent to the display device beginning at the location, at 510.

A determination may be made of whether a command to stop play of the media content was received, at 512. When the command to stop play of the media content was not received, the method may end, at 514.

When the command to stop play of the media content was received, data indicating the media content and a stop location may be stored, at 516. The data may be stored by the media recorder, by a media device associated with the media recorder, by another device, or by combinations thereof. The data may be retrieved if the media content is subsequently played again as bookmark data associated with the media content (i.e., data indicating the media content and a stop location). The data may be deleted when the media content is deleted. At 518, a bookmark indicator associated with the media content may be changed to reflect the presence of a bookmark, a number of bookmarks associated with the media content, or both. The method may end at 514.

The media recorder interface enables one or more bookmarks to be associated with recorded media content. When the user selects to play recorded media content that includes one or more bookmarks, the user may be presented with an option to view the recorded media content from the beginning or from a location associated with the one or more bookmarks. When the user stops play of the recorded media content, a bookmark may be associated with the location where the play stopped. The ability to add multiple bookmarks may facilitate enjoyment by multiple viewers of the features of the media recorder since each viewer will be able to quickly return to a location in the media content where the viewer stopped playback of the media content.

Figure 6:
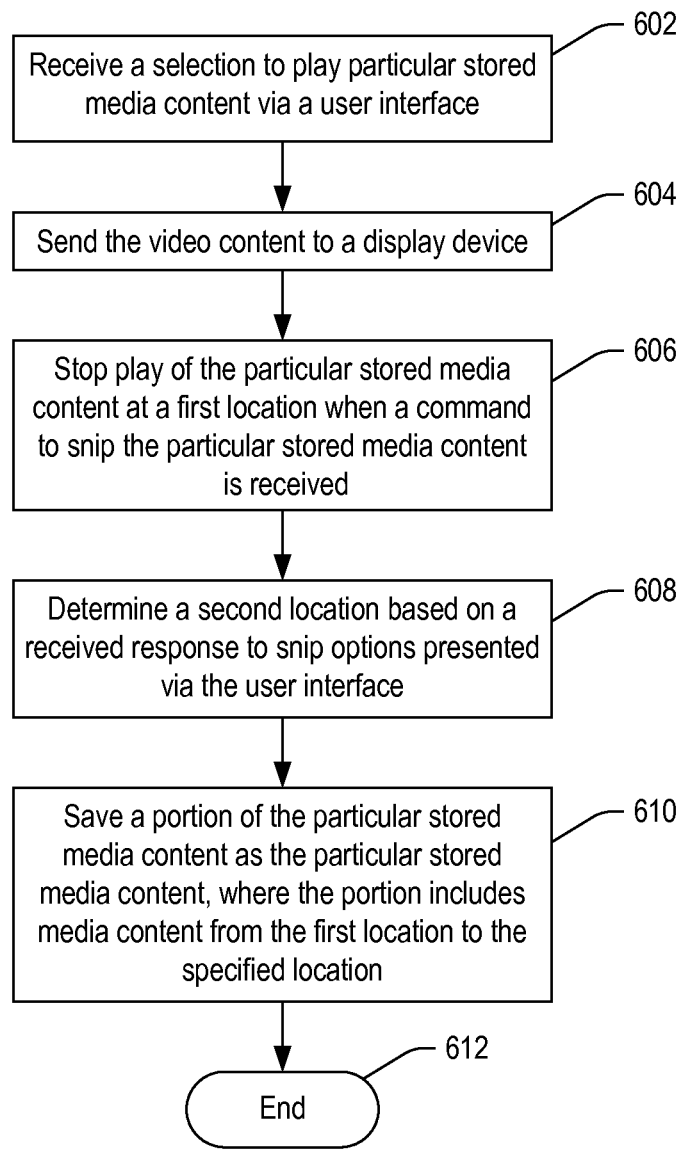
FIG. 6 is a flow chart of a fourth particular embodiment of a method of using a media recorder.

FIG. 6 is a flow chart of a fourth particular embodiment of a method of using a media recorder. In an embodiment, the method may be performed by a device that is coupled to the media recorder (e.g., the media device 106, the portable computing device 134, the remote computer system 138, or the computing device 140 of FIG. 1). At 602, a selection to play particular stored media content is received via a user interface. The media content is sent to a display device, at 604.

Play of the particular stored media content may be stopped at a first location when a command to snip the particular stored media content is received, at 606. A second location may be determined based on a received response to snip options presented via the user interface, at 608. The snip options may include an option to snip to the beginning of the particular media content, an option to snip to the end of the particular media content, an option to cancel the snip, and other options related to snipping content. When the option to cancel the snip is received, the method ends. When the option to snip to the beginning of the particular media content is received, the second location is the end of the particular media content. When the option to snip to the end of the particular media content is received, the second location is the beginning of the particular media content.

A portion of the particular stored media content may be saved as the particular stored media content, at 610. The portion includes media content from the first location to the second location. For example, the user may select to watch a recorded football game. The user may watch the first half of the game. The user may decide to do something else instead of watching the second half of the game, with the intention to view the second half of the game in the future. The user may also realize that rewatching the first half of the football game is something that will not occur. The user may stop play of the football game by sending a snip command (e.g., by actuating a snip command button of a remote control device or by selecting a snip option from the display device). When the snip command is received, playback of the football game may be stopped, the location of the stoppage may be designated as a first location, and the user may be presented with a first option to snip to the beginning, a second option to snip to the end, and a cancel option. The user may select the first option to snip to the beginning. A second location is determined to be the end of the football game. The media recorder stores the portion of the football game from the first location (i.e., the location where play was stopped) to the second location (i.e., the end of the football game). Snipping the football game may reduce a storage size of the recorded football game.

The media recorder may enable the user to snip portions of stored media content. Snipping a portion of the stored media content may enable storage of only a portion of the stored media content that the user is likely to view. Snipping the portion of the media content may enable the user to efficiently use available storage space of the media recorder.

Figure 7:
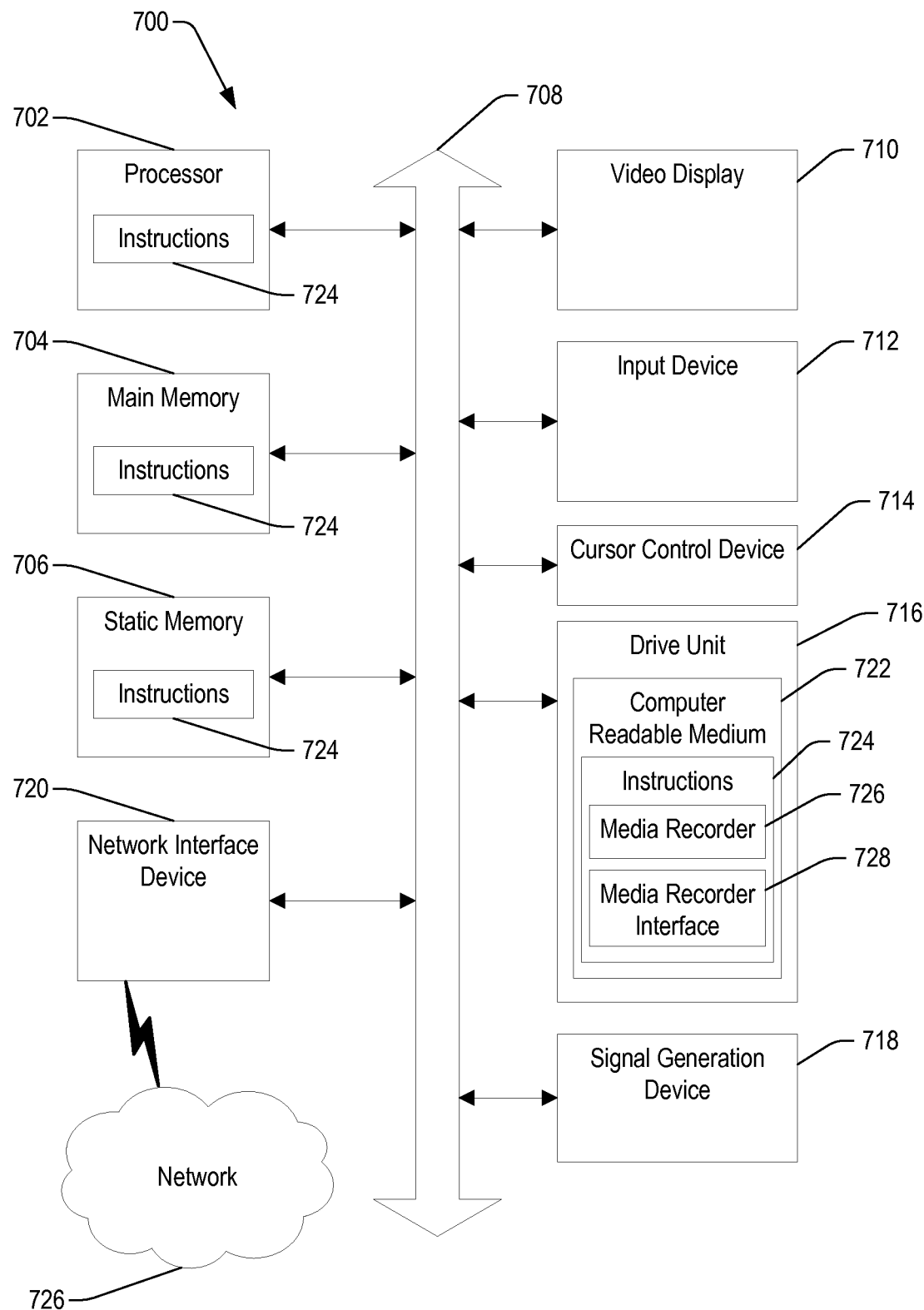
FIG. 7 is a block diagram of an illustrative embodiment of a general computer system.

Referring to FIG. 7, an illustrative embodiment of a general computer system is shown and is designated 700. The computer system 700 may include a set of instructions that can be executed to cause the computer system 700 to perform any one or more of the methods or computer based functions disclosed herein. The computer system 700 may operate as a standalone device or may be connected, e.g., using a network, to other computer systems or peripheral devices. For example, the computer system 700 may include or be included within any one or more of the media device 106, the service provider 110, the CPE 114, the portable computing device 136, the remote computer system 138, or the computing device 140 described with reference to FIG. 1.

In a networked deployment, the computer system 700 may operate in the capacity of a server or as a client user computer in a server-client user network environment, or as a peer computer system in a peer-to-peer (or distributed) network environment. The computer system 700 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a web appliance, or any other machine capable of executing a set of instructions (sequential or otherwise) that specify actions to be taken by that machine. In a particular embodiment, the computer system 700 may be implemented using electronic devices that provide video, audio, or data communication. Further, while a single computer system 700 is illustrated, the term "system" shall also be taken to include any collection of systems or sub-systems that individually or jointly execute a set, or multiple sets, of instructions to perform one or more computer functions.

As illustrated in FIG. 7, the computer system 700 may include a processor 702, e.g., a central processing unit (CPU), a graphics processing unit (GPU), or both. Moreover, the computer system 700 may include a main memory 704 and a static memory 706, which can communicate with each other via a bus 708. As shown, the computer system 700 may further include a video display unit 710, such as a liquid crystal display (LCD), a flat panel display, a solid state display, or a lamp assembly of a projection system. Additionally, the computer system 700 may include an input device 712, such as a keyboard, and a cursor control device 714, such as a mouse. The computer system 700 may also include a drive unit 716, a signal generation device 718, such as a speaker or remote control, and a network interface device 720. Some computer systems 700 may not include an input device (e.g., a server may not include an input device).

In a particular embodiment, as depicted in FIG. 7, the drive unit 716 (e.g., a hard drive or other memory device) may include a computer-readable non-transitory storage medium 722 in which one or more sets of instructions 724, e.g. software, can be embedded. Further, the instructions 724 may embody one or more of the methods or logic as described herein. In a particular embodiment, the instructions 724 may reside completely, or at least partially, within the main memory 704, the static memory 706, and/or within the processor 702 during execution by the computer system 700. The main memory 704 and the processor 702 also may include computer-readable non-transitory storage media. The instructions 724 in the drive unit 716, the main memory 704, the static memory 706, the processor 702, or combinations thereof may enable functionality of a media recorder 726. The instructions 724 in the drive unit 716, the main memory 704, the static memory 706, the processor 702, or combinations thereof may include a media recorder interface 728 that generates one or more user interfaces for communication with a media recorder, enables input of data associated with the media recorder, or both.

In an alternative embodiment, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations may include distributed processing, component/object distributed processing, and parallel processing. Alternatively, virtual computer system processing may be constructed to implement one or more of the methods or functionality as described herein.

The present disclosure contemplates a non-transitory computer-readable storage medium 722 that stores instructions 724 or receives, stores and executes instructions 724, so that a device connected to a network 726 may communicate voice, video or data over the network 726. While the non-transitory computer-readable storage medium is shown to be a single medium, the term "non-transitory computer-readable medium" includes a single medium or multiple media, such as a centralized or distributed database, and/or associated caches and servers that store one or more sets of instructions. The term "non-transitory computer-readable medium" shall also include any medium that is capable of storing a set of instructions for execution by a processor or that cause a computer system to perform any one or more of the methods or operations disclosed herein.

In a particular non-limiting, exemplary embodiment, the non-transitory computer-readable storage medium may include a solid-state memory such as a memory card or other package that houses one or more non-volatile read-only memories. Further, the non-transitory computer-readable storage medium may be a random access memory or other volatile re-writable memory. Additionally, the non-transitory computer-readable storage medium may include a magneto-optical or optical medium, such as a disk or tapes or other storage device. Accordingly, the disclosure is considered to include any one or more of a non-transitory computer-readable storage medium and other equivalents and successor media, in which data or instructions may be stored.

Although the present specification describes components and functions that may be implemented in particular embodiments by particular standards and protocols, the disclosed embodiments are not limited to such standards and protocols. Standards and protocols are periodically superseded by faster or more efficient equivalents having essentially the same functions. Accordingly, replacement standards and protocols having the same or similar functions as previous standards and protocols are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
   displaying a user interface for a media recorder in response to first user input;
   receiving a first command to display recording space for the media recorder via the user interface;
   sending, in response to the command, a graphical representation of the recording space to a display device, wherein the graphical representation comprises:
      a first portion that represents the recording space available for new recordings,
         wherein first indicia associated with the first portion indicates a first size of the first portion as a first percentage of the recording space, wherein second indicia associated with the first portion indicates remaining recording time in a first recording format, and wherein third indicia associated with the first portion indicates remaining recording time in a second recording format;
      a second portion that represents the recording space used to store first media content that is deletable by the media recorder without additional user input when a condition is met, wherein fourth indicia associated with the second portion indicates a second size of the second portion as a second percentage of the recording space; and
      a third portion that represents the recording space used to store second media content, wherein an item of the second media content can only be deleted by the media recorder when the media recorder receives a user command to delete the item, and wherein fifth indicia associated with the third portion indicates a third size of the third portion as a third percentage of the recording space;
   receiving a second command to display a portion of media content stored by the media recorder; and
   sending a listing of the portion of media content to the display device, wherein each entry in the listing comprises a category title, a media content title of stored media content, or both, and wherein each entry in the listing is associated with a particular status indicator to signify a particular condition to be met before media content associated with the entry is deleted, wherein the listing is configured to include a comment indicator associated with a first title to signify that a comment is associated with stored media content associated with the first title, wherein the comment indicator includes a numeric representation of a number of comments associated with the first title, and wherein the numeric representation is a sum of a number of text comments associated with the first title and a number of audio comments associated with the first title.

2. The method of claim 1, wherein the particular status indicator is "D" when the media content is to be stored until deleted, wherein the particular status indicator is "N" when the media content is to be stored until space is needed, wherein the particular status indicator is "V" when the media content is to be stored until viewed, and wherein the particular status indicator is "e" followed by a number when the number of most recent episodes is to be kept.

3. The method of claim 1, wherein the first recording format is a three dimensional recording format.

4. The method of claim 1, further comprising sending a second listing to the display device of a sub-category title, a second media content title of stored media content associated with a particular category title, or both, when authorized input selecting the particular category title is received, wherein the authorized input is authorized upon receipt of a password.

5. The method of claim 1, wherein a particular media content title is editable via the user interface.

6. The method of claim 1, wherein the first indicia, the fourth indicia, and the fifth indicia are graphically represented as a stacked bar graph.

7. The method of claim 1, wherein the numeric representation is a numeric representation of comments entered at the media recorder that are associated with the first title.

8. The method of claim 1, wherein the listing includes a non-numeric file size associated with each media content title.

9. The method of claim 8, wherein the non-numeric file size is "XL" when a file size of an associated media content title is extra large, wherein the non-numeric file size is "L" when the file size of the associated media content title is large, wherein the non-numeric file size is "M" when the file size of the associated media content title is medium, and wherein the non-numeric file size is "S" when the file size of the associated media content title is small.

10. The method of claim 1, wherein the listing is configured to include a bookmark indicator when particular stored media content associated with a first title includes a bookmark to indicate a particular position in the particular stored media content, and wherein the bookmark indicator includes a numeric representation of a number of bookmarks associated with the first title.

11. The method of claim 10, further comprising:
    receiving a third command to play the first title;
    sending a first interface to resume playing the first title when the first title is associated with a single bookmark; and
    sending a second interface to select a particular bookmark to resume from when the first title is associated with more than one bookmark.

12. A media device comprising:
    a processor;
    a memory accessible to the processor, wherein the memory includes instructions executable by the processor to perform operations including:
        displaying a user interface for a media recorder in response to first user input;
        receiving a first command to display recording space for the media recorder via the user interface;
        sending a graphical representation of the recording space to a display device in response to the command, wherein the graphical representation comprises:
            a first portion that represents the recording space available for new recordings, wherein first indicia associated with the first portion indicates a first size of the first portion as a first percentage of the recording space, wherein second indicia associated with the first portion indicates remaining recording time in a first recording format, and wherein third indicia associated with the first portion indicates remaining recording time in a second recording format;

a second portion that represents the recording space used to store first media content that is deletable by the media recorder without additional user input when a condition is met, wherein fourth indicia associated with the second portion indicates a second size of the second portion as a second percentage of the recording space; and a third portion that represents the recording space used to store second media content, wherein an item of the second media content can only be deleted by the media recorder when the media recorder receives a user command to delete the item, and wherein fifth indicia associated with the third portion indicates a third size of the third portion as a third percentage of the recording space;

receiving a second command to display a portion of media content stored by the media recorder; and sending a listing of the portion of media content to the display device, wherein each entry in the listing comprises a category title, a media content title of stored media content, or both, and wherein each entry in the listing is associated with a particular status indicator to signify a particular condition to be met before media content associated with the entry is deleted, wherein the listing is configured to include a comment indicator associated with a first title to signify that a comment is associated with stored media content associated with the first title, wherein the comment indicator includes a numeric representation of a number of comments associated with the first title, and wherein the numeric representation is a sum of a number of text comments associated with the first title and a number of audio comments associated with the first title.

13. The media device of claim 12, wherein selection of the second portion causes the user interface to send a second listing of the first media content to the display device.

14. The media device of claim 12, wherein selection of the third portion causes the user interface to send a second listing of the second media content to the display device.

15. A computer-readable storage device comprising instructions executable by a processor to perform operations including:

displaying a user interface for a media recorder in response to first user input;

receiving a first command to display recording space for the media recorder via the user interface;

sending a graphical representation of the recording space to a display device in response to the command, wherein the graphical representation comprises:

a first portion that represents the recording space available for new recordings, wherein first indicia associated with the first portion indicates a first size of the first portion as a first percentage of the recording space, wherein second indicia associated with the first portion indicates remaining recording time in a first recording format, and wherein third indicia associated with the first portion indicates remaining recording time in a second recording format;

a second portion that represents the recording space used to store first media content that is deletable by the media recorder without additional user input when a condition is met, wherein fourth indicia associated with the second portion indicates a second size of the second portion as a second percentage of the recording space; and a third portion that represents the recording space used to store second media content, wherein an item of the second media content can only be deleted by the media recorder when the media recorder receives a user command to delete the item, and wherein fifth indicia associated with the third portion indicates a third size of the third portion as a third percentage of the recording space;

receiving a second command to display a portion of media content stored by the media recorder; and sending a listing of the portion of media content to the display device, wherein each entry in the listing comprises a category title, a media content title of stored media content, or both, and wherein each entry in the listing is associated with a particular status indicator to signify a particular condition to be met before media content associated with the entry is deleted, wherein the listing is configured to include a comment indicator associated with a first title to signify that a comment is associated with stored media content associated with the first title, wherein the comment indicator includes a numeric representation of a number of comments associated with the first title, and wherein the numeric representation is a sum of a number of text comments associated with the first title and a number of audio comments associated with the first title.

16. The computer-readable storage device of claim 15, wherein the first user input is received at a set-top box device via a remote control device.

17. The computer-readable storage device of claim 15, wherein the first user input is received at a portable computing device, and wherein the representation of the display device is received by the portable computing device from the media recorder via a network connection.

18. The computer-readable storage device of claim 15, wherein the operations further include:

receiving a selection to play particular stored media content via the user interface;

sending the particular stored media content to the display device;

stopping play of the particular stored media content at a first location when a third command to snip the particular stored media content relative to a specified location of the particular stored media content is received; and saving a fourth portion of the particular stored media content to the media recorder as the particular stored media content, wherein the fourth portion includes content from the first location to the specified location.

19. The computer-readable storage device of claim 18, wherein the specified location is a beginning of the particular stored media content.

20. The computer-readable storage device of claim 18, wherein the specified location is an end of the particular stored media content.

* * * * *